2,736,148

METHOD OF MACHINING BY HIGH FREQUENCY VIBRATORY ABRASION

Charles J. Thatcher, New York, N. Y., assignor to Robert O. Thatcher

No Drawing. Application July 30, 1953, Serial No. 371,408

8 Claims. (Cl. 51—281)

This invention relates to a novel improvement in methods for shaping of metals and other hard substances by the use of ultrasonic vibratory abrasive slurries employed in and/or applied to drills, milling machines, lathes, shapers, etc.

As is well known and has been disclosed by various patentees, when a comminuted abrasive is suspended in an aqueous slurry, flowing as a film between a hard workpiece surface and the end adjacent to that surface of a blunt drilling tool which vibrates at high or ultrasonic frequency, a more or less rapid wearing away or cutting of said workpiece surface occurs. This operation has so far been restricted to drilling of holes or polishing or engraving of surfaces. Water has been used heretofore to form such slurries in the practice of this method of cutting, which has been ascribed by workers in the art to the disintegrating effect of cavitation.

Thus, it has been argued by a prior patentee that the fact that water gave better results than cutting or lubricating oils or kerosene supported the theory that the effect is due to cavitation; but applicant has found that the remarkable cutting action is, in fact, to be ascribed to the destructive mechanical effects of abrasive particles violently agitated by the gas bubbles liberated and vibrated by the passage of intense sound through a liquid; and that intense, destructive local strains are set up in the vicinity of pulsating gas bubbles. For it will be shown that, under proper conditions, water containing gas bubbles of proper size, when subjected to high-frequency vibration, has an increase of kinetic energy of about 15,000 times over that developed by irradiation in the absence of bubbles; and since air is more soluble in water than in other liquids such as oils, it is obvious, therefore, that water is more suitable for cutting slurries under high-frequency vibration, not because of cavitation but because air bubbles, becoming resonant or otherwise violently active under ultrasonic vibration, can be more copiously liberated from water saturated or partly saturated with air than from other liquids.

It has been observed that when intense sound waves are maintained in water some of the dissolved gases are released. Soon after the sound begins, small bubbles appear in the water; these move to and fro and increase in size, partly by absorption of gas from the water and partly by combination with other bubbles. At a particular stage of growth the bubbles pass through a brief period of violent activity during which they rush about rapidly, appearing to the eye as streaks on account of persistence of vision. They emerge from this brief interlude increased in size and relatively quiescent. Further combinations with other bubbles occur, and, finally, as the buoyancy increases, large bubbles, perhaps 1 or 2 millimetres in diameter, rise to the surface and escape to the atmosphere. Consequently, after repeated, continuous use of any body of slurry, the aqueous liquid loses all of its dissolved air and air bubbles, and thus becomes impoverished and ineffective as an abrasive cutting agent. These phenomena are best observed within a system of standing waves, because in a simple progressive wave bubbles are continually driven away from the source of sound and are difficult to observe.

Since bubbles are small in comparison with the wavelength the alternating mechanical pressure in the sound-wave acts approximately uniformly over their surfaces; they pulsate in the simplest radial mode. Each bubble has restoring force, inertia, and damping, and pulsates as a resonant mechanical system having one degree of freedom. Each bubble, even those too small to be seen by the naked eye, will violently agitate any small solid particle, such as a grain of a finely divided abrasive, floating in its vicinity. The multitudinous, violent impacts of the abrasive grains upon the adjacent surfaces of the work piece, all occasioned by the abrasive impelling force of the violently pulsating air bubbles, is the reel source, rather than cavitation, of the remarkable cutting action of ultrasonic abrasive slurries. Realization of this fact by workers in this art will do much to enhance the intelligent, practical commercial usefulness of this new method of abrasive cutting.

Thus it appears from the following calculation that the increase of kinetic energy in an abrasive slurry in irradiated water containing pulsating gas bubbles and abrasive particles of an effective size is about 15,000 times that developed by mere hydrostatic pressure alone:

With $p$ representing the instantaneous alternating pressure in irradiated water, in the absence of the bubbles the strain of pulsation is $p/3K$, where $K$ is the bulk modulus of the liquid; the presence of the bubbles gives rise to the much larger strain $p/3kp_0$, where $p_0$ is the hydrostatic pressure and $k$ is the ratio of the specific heats of the air at constant pressure and volume. The ratio of increase is $K/kp_0$; and, assuming, $K=2.06\times10^{10}$ dynes per sq. cm., and $p_0$ equal to $10^6$ dynes per sq. cm., and $k=1.4$, this ratio is about 14,700.

The increase is the same for all bubbles appreciably smaller than the resonant bubbles, and for all frequencies. All bubbles, even those too small to be seen by the naked eye, are therefore likely to contribute to the violent surface disintegrating effect of the abrasive.

By skillful control and use of this enormous increase of kinetic energy, even the drilling machines now in use can be substantially increased in efficiency and power by proper stabilization, control, and enhancement of the potential gas evolving capacity of the liquid of the slurry, and without any other changes in the character of make-up of the device itself, or any increase in the power input.

The object of this invention accordingly is to control and properly enhance the stabilization and concentration of air, or other gas bubbles of effective size in ultrasonically irradiated abrasive slurries.

It is further the object of this invention thus to increase the efficiency and speed of cutting of surfaces by ultrasonic irradiation of abrasive slurries between a vibratory tool and a hard workpiece. Further objects will appear from the following.

The abrasive slurry, circulated as a thin film between such a tool and a workpiece, is recirculated, as is well known, as by means of a suitable pump. The exposure of the slurry to the intense oscillating force as it flows in a thin film between the tool and work surface promptly an efficiently liberates and expels most of the dissolved gas, leaving the recirculated slurry impoverished for reasons heretofore explained. The result, as has been observed, is that ultrasonic cutting tools become less efficient or exhibit vagaries in operation in prolonged continuous use. It seems obvious, therefore, that the decrease in efficiency is ascribable to the impoverishment of the liquid in resonant gas bubbles and smaller bubbles of effective size; and dependable, commercially useful, hour- and day-long continuous use of ultrasonic abrasive cutting will become possible, therefore, only by preventing such impoverishment of the liquid slurries.

To remedy this the effluent liquid from the cutting machine can be resaturated with air during recirculation by spraying the liquid or otherwise exposing it, preferably in thin films, to a body of air preferably under pressure, and sufficiently long to saturate the slurry again with dissolved air. However, I find that this restoration of gas concentration can be accomplished more effectively and practically by adding to the slurry a suitable solid substance, such as sodium bicarbonate, which is soluble in the liquid and which will dissociate under the ultrasonic force in the film at the point of contact between tool end and the abrasive work surface, thereby to liberate carbon dioxide gas by the following equation:

$$2NaHCO_3 = Na_2CO_3 + H_2O + CO_2$$

Since carbon dioxide gas is about 50 times more soluble than air in water by volume the concentration of small or minute free gas bubbles in the active film of abrasive slurry will thus be largely increased and with corresponding increase in cutting efficiency and rapidity.

The abrasive pulsation effect of gas bubbles is not primarily dependent upon the chemical composition of the gas, but rather upon its physical characteristics, wherefore it can be expected that carbon dioxide will be at least equally efficient as a source of abrasive action as air under equal concentrations; but it is in fact more efficient because the concentration of dissolved carbon dioxide and therefore of resonant or effective free gas bubbles can be maintained at a higher level due to its greater solubility in water. Moreover, reactivation of an impoverished abrasive slurry effluent can be more easily attained in a solution of sodium carbonate simply by bubbling carbon dioxide through the liquid at some point during its recirculation or by adding thereto a small lump of Dry Ice, i. e., solidly frozen carbon dioxide.

The most effective concentration of sodium bicarbonate to thus improve high frequency abrasive cutting is not now known, but it should be not more than say 8 per cent—its solubility in cold water. It is obvious, however, that other carbonates of lesser solubility, such as calcium carbonate or bicarbonate, will likewise be effective for the purposes indicated, and that the solid compound should be added to the slurry in considerable concentration, say 10% more or less, to provide a stock supply of a potentially dissolvable and decomposable carbonate, to replenish $CO_2$ by hydrolytic dissociation whenever the slurry becomes impoverished or deficient in maximum dissolved $CO_2$ concentration. A mixture of sodium bicarbonate or carbonate with calcium or other relatively insoluble carbonates will be found to provide a highly efficient additive product to stabilize such abrasive cutting slurries, and to insure maximum or high level cutting efficiency during prolonged use of an ultrasonic tool.

My invention contemplates use of such combinations of soluble and insoluble carbonates, and, in fact, of any compound capable of decomposing under high frequency vibration to form a gas more or less soluble in a liquid slurry. Further examples of such equivalent compounds are ammonium carbonate or bicarbonate, a solution of which in an abrasive slurry can be expected to split up into dissolved and free $NH_3$ and $CO_2$ under high frequency vibration; and, because it and $NH_3$ have different pH and solubility values than solutions containing sodium compounds of $CO_2$ carbonates of ammonia can be more effective for cutting of some hard substances, particularly metals, alloys, ceramic materials, etc. And, similarly, sodium sulfite or bisulfite will, in some instances, be a more effective additive to abrasive slurries because of the greater solubility of $SO_2$ and its further removal in solution from the pH value and solubility of sodium carbonate or bicarbonate solutions. My invention comprehends the use of any additive compound to the solid abrasive of high frequency abrasive slurries, which will beneficially increase their stabilized concentration in pulsating gas bubbles during use, or beneficially affect the pH value of the slurry for cutting purposes.

I claim:

1. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and increasing the concentration of dissolved gas in the liquid during an inactive stage of recirculation.

2. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and injecting air into the liquid, during an inactive stage of circulation, to increase the concentration of dissolved gas in the liquid.

3. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and injecting carbon dioxide into the liquid, during an inactive stage of circulation, to increase the concentration of dissolved gas in the liquid.

4. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and adding a compound during recirculation which dissociates in solution to form dissolved gas, thus to increase gas bubble concentration and abrasive activity in said films.

5. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and increasing the concentration of dissolved gas in the liquid during an inactive stage of recirculation by adding sodium bicarbonate to the recirculated liquid.

6. In the drilling, shaping or milling of workpieces of a hard substance by the circulation, between a work face and tool end, of a film of a liquid slurry containing a gas in solution together with comminuted abrasive particles in suspension, the improved method which comprises the steps of imparting high frequency oscillations to said tool end and maintaining it adjacent to said work, flowing a film of said slurry therebetween, generating pulsating gas bubbles in said liquid film from the dissolved gas by the impact thereupon of high-frequency mechanical vibrations of the tool end while in contact with said film, recirculating the effluent, liquid slurry after said use, and adding to the liquid a compound of carbonic acid which dissociates in solution to form dissolved gas.

7. In a method of drilling, shaping or otherwise machining a work piece of hard substance by ultrasonic abrasive action, which method includes the step of circulating between the surface of the work piece to be machined and the confronting face of a tool subjected to high frequency vibrations, of a liquid film of a slurry comprising an aqueous suspension of comminuted hard abrasive material, in combination with the steps of adding to said liquid slurry a substance which is capable of liberating free gas in said liquid slurry, and generating gas bubbles in a said film by subjecting it to the said high frequency vibrations.

8. In a method of drilling, shaping or otherwise machining a work piece of hard substance by ultrasonic abrasive action, which method includes the step of circulating between the surface of the work piece to be machined and the confronting face of a tool subjected to high frequency vibrations, of a liquid film of a slurry comprising an aqueous suspension of comminuted hard abrasive material, in combination with the steps of adding a carbonate to said liquid slurry and generating carbonic acid gas bubbles in said film by subjecting it to the said high frequency vibrations.

References Cited in the file of this patent

UNITED STATES PATENTS

| Number | Name | Date |
|---|---|---|
| 1,682,420 | Rolf | Aug. 28, 1928 |
| 1,800,743 | Morris | Apr. 14, 1931 |
| 1,944,898 | McKee | Jan. 30, 1934 |
| 1,986,850 | Pohl et al. | Jan. 8, 1935 |
| 2,033,263 | Tone | Mar. 10, 1936 |
| 2,113,185 | Thilenius | Apr. 5, 1938 |
| 2,268,723 | Scherer | Jan. 6, 1942 |
| 2,271,743 | Nagy | Feb. 3, 1942 |
| 2,452,211 | Rosenthal | Oct. 26, 1948 |
| 2,497,057 | Pape et al. | Feb. 7, 1950 |
| 2,580,716 | Balamuth | Jan. 1, 1952 |